UNITED STATES PATENT OFFICE.

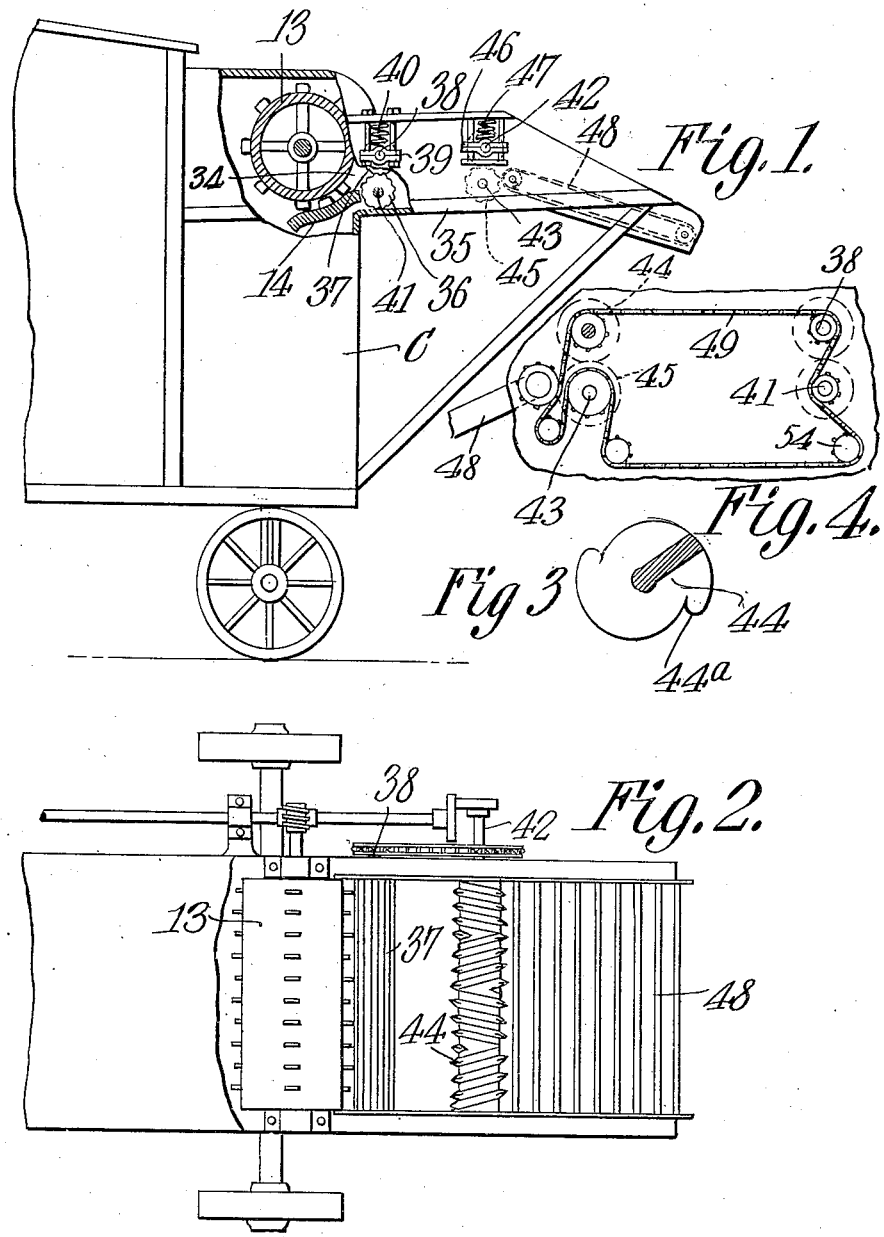

GEORGE E. RICHMOND, OF HOUSTON, TEXAS, ASSIGNOR OF ONE-HALF TO FRANK BROWN WEEKS, OF HOUSTON, TEXAS.

BAND-CUTTER AND FEEDER.

No. 898,603.            Specification of Letters Patent.            Patented Sept. 15, 1908.

Original application filed September 1, 1906, Serial No. 332,966. Divided and this application filed February 8, 1908. Serial No. 414,948.

*To all whom it may concern:*

Be it known that I, GEORGE E. RICHMOND, a citizen of the United States, residing at Houston, in the county of Harris and State of Texas, have invented a new and useful Band-Cutter and Feeder, of which the following is a specification.

This invention relates to threshing machines and is a division of an application filed by me in the United States Patent Office on September 1st, 1906, Serial No. 332,966.

The object of the invention is to provide simple, durable and efficient means whereby the bands ordinarily employed for tying the bundles of grain can be cut and said grain fed to the threshing mechanism.

A still further object is to provide means whereby the grain subsequent to the cutting of the bands will be spread out flat so that it will be properly supplied to the threshing mechanism.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a side elevation of the band cutting and grain feeding mechanism, the threshing cylinder and concave being shown in section; Fig. 2 is a plan view of the mechanism shown in Fig. 1; and Fig. 3 is a transverse section through one of the band cutting knives. Fig. 4 is a side elevation of one form of mechanism for transmitting motion to the rollers included in the machine constituting the present invention.

Referring to the figures by characters of reference, C is a casing having a threshing cylinder 13 and a concave 14 disposed therein adjacent the feed opening 34. A feed table 35 extends from this feed opening and journaled above this table and in front of the opening 34 is a pair of longitudinally corrugated feed rollers 36 and 37. The shaft 38 of the upper roller 37 is journaled in vertically slidable boxes 39 which are pressed by suitably arranged springs 40 in the direction of the bearings of the shaft 41 of the lower roller 36. It is thus apparent that feed rollers can be separated by the pressure of material passing between them. Shafts 42 and 43 are disposed above the table 35 some distance in front of the feed rollers 36 and 37 and the shaft 42 carries a plurality of band cutting knives 44 which are mounted on the shaft in oppositely arranged oblique series whereby the edges of the knives or cutters consitute spirals or flanges which serve to spread the grain laterally so as to form a bat which is retarded by the action of the cutters and a corrugated roller 45 which is arranged upon the shaft 43. This retarding action is due to the fact that the rollers 36 and 37 rotate more rapidly than the roller 45 and the knives 44. Shaft 42 is mounted for rotation in vertically slidable boxes 46 which are pressed toward the bearings of shaft 43 by means of springs 47.

As shown in Fig. 3 each of the blades 44 is preferably formed with outstanding curved cutting edges 44$^a$ which are designed to catch into and cut the bands upon the bundles supplied to the machine. An endless conveyer 48 serves to supply the bundles of grain to the corrugated roller 45 and the band cutting knives upon shaft 42. As soon as the bundles are brought against the knives and the roller 45 the bands are cut by the knives which, by reason of their peculiar disposition upon the shaft, serve to spread the grain laterally. This grain is then caught between the rollers 36 and 37 and is fed to the threshing mechanism against the slight retarding action of the band cutting knives and the corrugated roller 20. The grain will therefore be held securely while being operated upon by the threshing mechanism and at the same time will be fed forward at the desired speed which is regulated by the operating mechanism of the feed rollers. These rollers rotate reversely to the roller 45 and the shaft 42 and are rotated at any desired speed and by any suitable mechanism. It is apparent that the grain while being operated upon is held with some degree of security between the feed rollers which are obviously rotated with much less speed than the threshing cylinder.

The mechanism employed for transmitting motion to the various rollers and to the knives may, if desired, consist of a chain 49 extending over sprockets 50 and 51 secured to shafts 38 and 42 respectively. Said chain also engages sprockets 52 and 53 arranged upon the lower shafts 41 and 43, there being an arrangement of idlers 54 whereby the chain is caused to so engage the sprockets as to rotate them in the proper direction to feed material toward the concave. The same chain can also be utilized for driving the sprocket 55 of the conveyer 48 and the entire chain can be sufficiently slack to permit a limited vertical movement of the shafts 38 and 42. The sprockets 51 and 53 are smaller than the sprockets 50 and 52 so that the feed rollers 36 and 37 will rotate more rapidly than the knives 44 and the corrugated roller 45. It is of course desirable to rotate the knives 44 more rapidly than the roller 45 so that they will operate to more efficiently cut the bands.

What is claimed is:

1. In a grain separator the combination with a casing, and a table; of superposed longitudinally grooved feed rollers mounted within the casing at one end of the table, a longitudinally grooved roller mounted within the casing adjacent the other end of the table, a series of revoluble band cutting blades disposed above and coöperating with the last mentioned roller, said blades and the roller thereunder having mechanism for rotating them at a slower speed than the feed rollers, and a conveyer for directing material between the blades and the roller thereunder.

2. In a grain separator the combination with a casing, and a table; of a longitudinally grooved roller within the casing adjacent one end of the table, a shaft journaled thereabove and parallel therewith, a series of band cutting blades upon and revoluble with the shaft, said blades being arranged in diagonally disposed series, a conveyer for directing material between the blades and the roller thereunder, and superposed longitudinally grooved feed rollers within the casing and adjacent the other end of the table, said feed rollers having mechanism for rotating them at a greater speed than the knives and the roller thereunder.

3. In a machine of the character described the combination with a casing, a table, and a conveyer; of a band cutter interposed between the table and conveyer and comprising a longitudinally corrugated roller, a spring pressed shaft journaled above the roller, and a plurality of knives secured to and revoluble with the shaft, said knives being arranged in diagonal series, the adjoining series being oppositely inclined, each blade comprising a disk and oppositely disposed outstanding curved cutting projections on the disk.

In testimony that I claim the foregoing as my own, I have hereto affixed my signature in the presence of two witnesses.

GEORGE E. RICHMOND

Witnesses:
   E. N. MILLS,
   N. L. MILLS.